(12) United States Patent
Iwasa (10) Patent No.: US 6,256,458 B1
(45) Date of Patent: Jul. 3, 2001

(54) LENS HOUSING

(75) Inventor: Kazuyuki Iwasa, Hino (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/391,587

(22) Filed: Sep. 7, 1999

(30) Foreign Application Priority Data

Sep. 7, 1998 (JP) .................................................. 10-252823

(51) Int. Cl.[7] .................................................. G03B 17/04
(52) U.S. Cl. .............................................. 396/85; 396/349
(58) Field of Search ................................. 396/72, 85, 349

(56) References Cited

U.S. PATENT DOCUMENTS 5,983,033 * 11/1999 Yamazaki et al. ...................... 396/85

FOREIGN PATENT DOCUMENTS 9-152649   6/1997   (JP) .

* cited by examiner

*Primary Examiner*—W. B. Perkey
(74) *Attorney, Agent, or Firm*—Ostrolenk, Faber, Gerb & Soffen, LLP (57) ABSTRACT

A lens housing has an immobilized frame supporting a drive ring, in which a rotating frame supported therein and a moving frame having a helicoid ring are supported so as to be rotationally extendable and/or retractable. When the helicoid ring is rotationally driven, the rotating frame and the moving frame can be integrally extended from a collapsed-barrel position to an image-capturing position. When the rotating frame in the image-capturing position is rotationally driven by the drive ring, the individual frames can be extended to zoom positions. The lens housing allows compactness and miniaturization to be implemented.

14 Claims, 7 Drawing Sheets

LENS HOUSING

BACKGROUND OF THE INVENTION

1. Field of the Invention

The present invention relates to a lens housing for moving lens frames to a stowed position and an image-capturing position.

2. Description of the Related Art

Conventionally, a camera coupling apparatus has been proposed as a structure of lens housing that allows variation in the focal length in Japanese Unexamined Patent Publication No.9-152649. This coupling apparatus extends lens frames from a collapsed-barrel position up to a projected position (close to a wide angle position) where an image can be captured. It also extends lens frames in a zooming-operated region. While extending lens frames from the collapsed-barrel position to the projected position, the lens frames and a zoom-out, gear for zoom-driving are interengaged, enabling the lens housing for zoom-driving.

The aforementioned zoom-out gear in the camera coupling apparatus, as proposed in the aforementioned Japanese patent application, however, is axially and radially large, requiring a considerably large installation space. This is an obstacle to miniaturization of cameras in which the aforementioned coupling apparatus is installed.

SUMMARY OF THE INVENTION

In order to solve the problems described above, an object of the present invention to provide a lens housing that allows movement of lens frames to a stowed position and an image-capturing position, thereby promoting miniaturization of cameras and other related items.

To this end, the invention provides a lens housing for moving lens frames to a stowed position and an image-capturing position, and for varying the focal length. The lens housing has image-capturing lenses supported by lens frames and allowing variation in the focal length, a stationary frame having a female helicoid thread for moving all the lens frames and a rotatable drive gear provided parallel to an optical axis of the image-capturing lenses. The lens housing also has a helicoid member having a gear section engaged with the drive gear and a male helicoid thread, engageable with the female helicoid thread by rotation of the drive gear for moving all the lens frames to the stowed position and the image-capturing position. Also, the lens housing has a drive member supported by the stationary frame and rotatable about the optical axis. When all the lens frames are advanced fully, the drive member engages with the lens frames for rotating same. Consequently, the image-capturing lenses included in the lens frames are moved in a direction corresponding with the optical axis, and the focal length of the image-capturing lenses is varied.

Other features and advantages of the present invention will become apparent from the following description of the invention which refers to the accompanying drawings.

DETAILED DESCRIPTION OF EMBODIMENTS OF THE INVENTION

Hereinbelow, a description will be given of an embodiment of these present invention with reference to the drawings.

Figure 1:
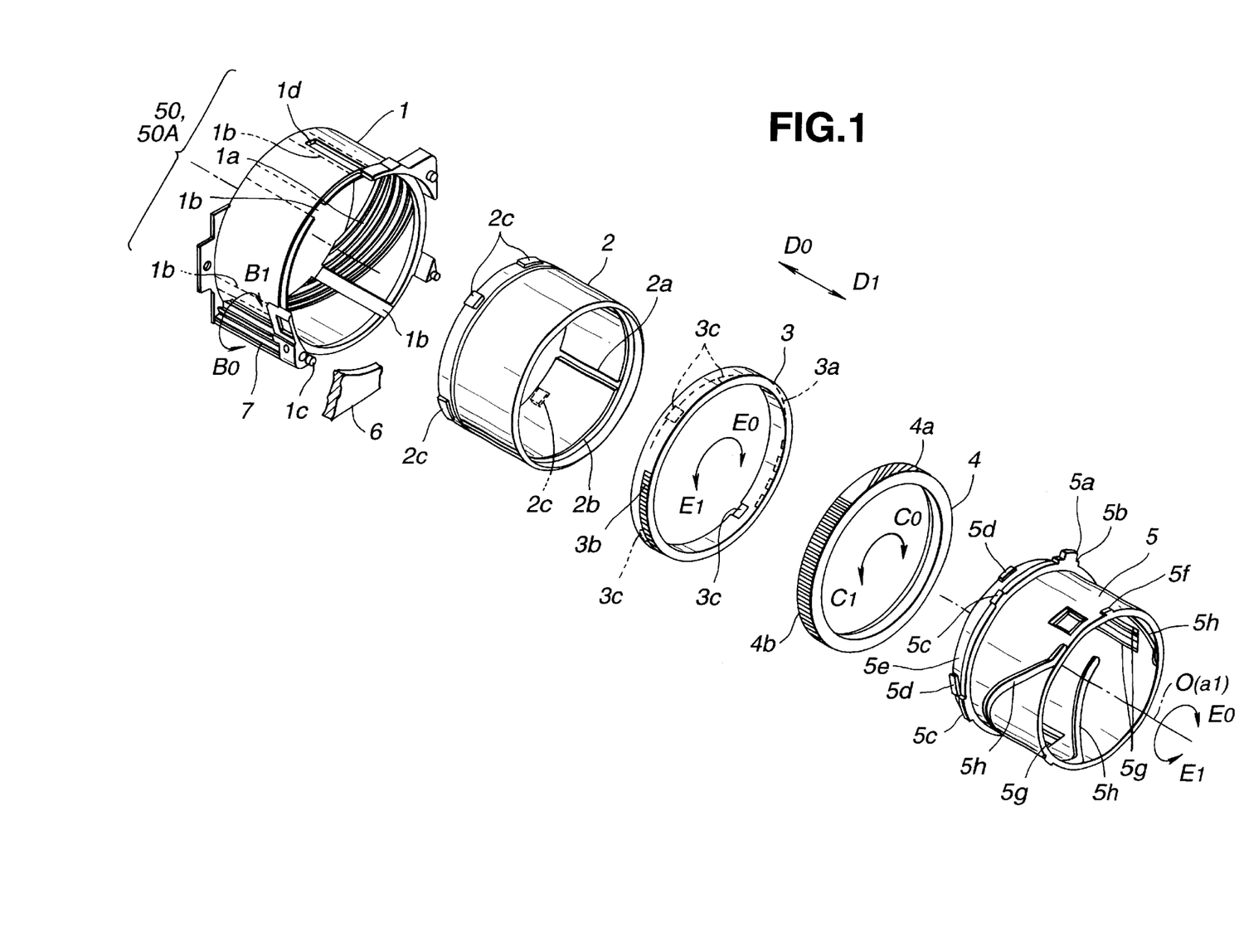
FIG. 1 is an exploded perspective view of an embodiment of a collapsible-barrel drive system including a lens housing according to the present invention.
Figure 2:
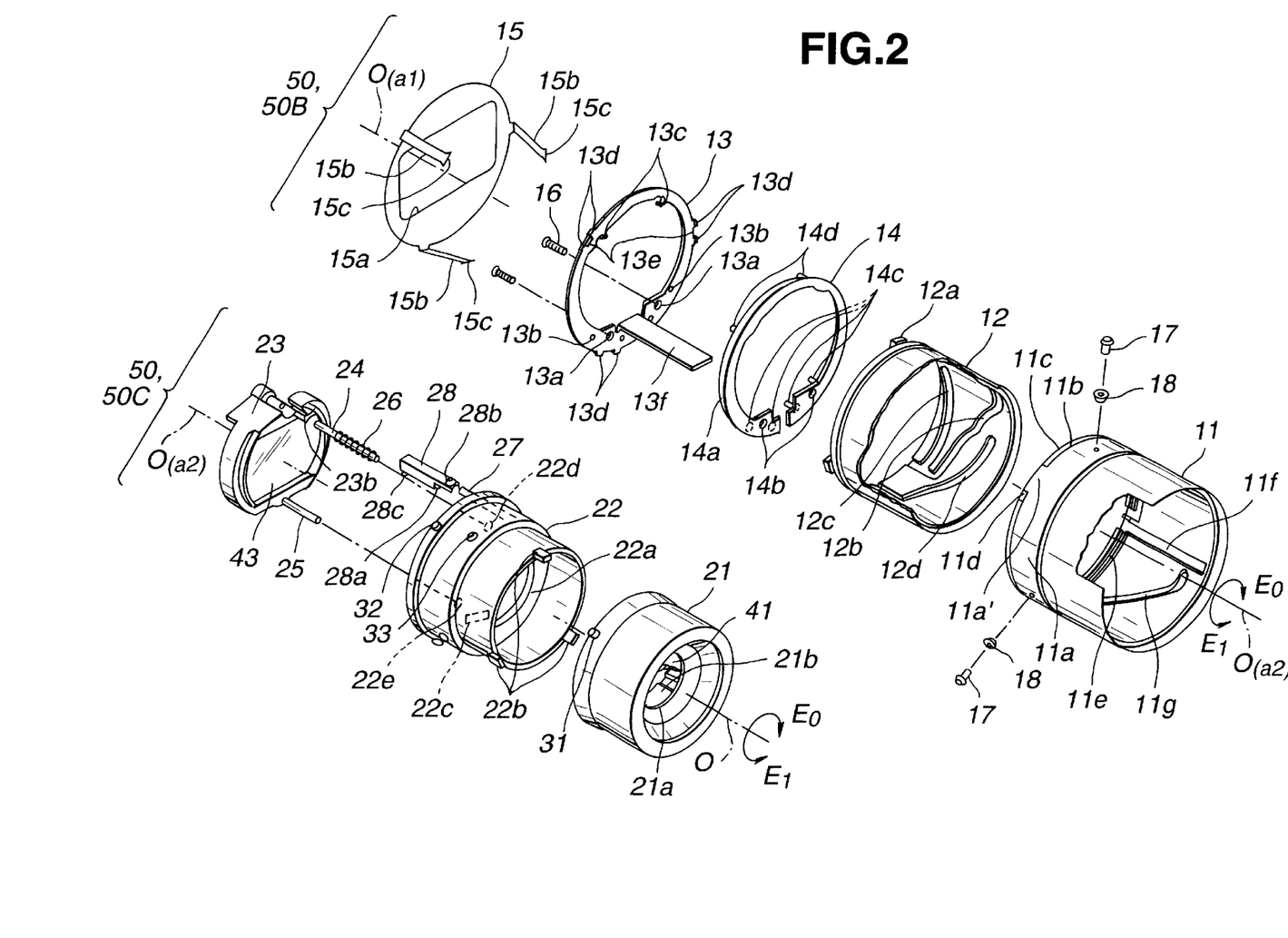
FIG. 2 is an exploded perspective view showing lens-group drive systems and lens-group frame sections of the lens housing of the embodiment of FIG. 1.
Figure 3:
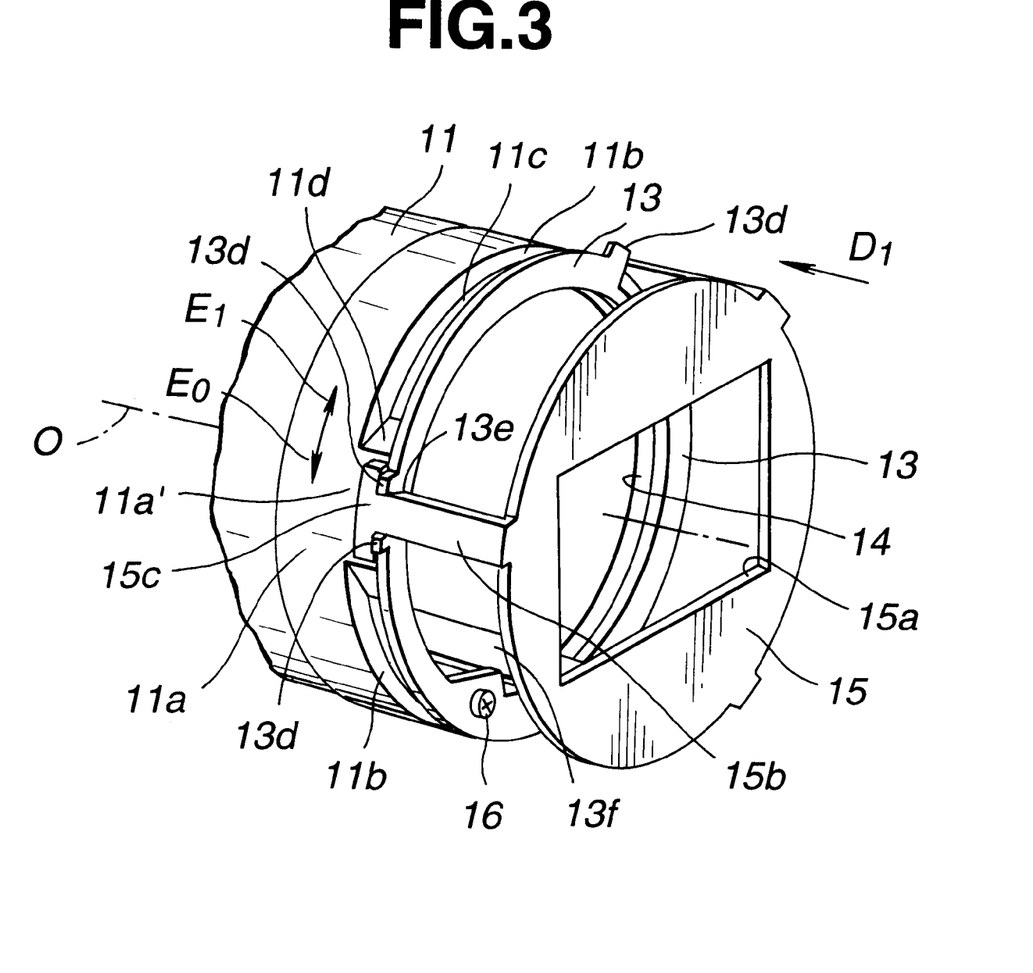
FIG. 3 is a partial perspective view of a movable flare aperture of the lens housing according to the embodiment of FIG. 1.
Figure 4:
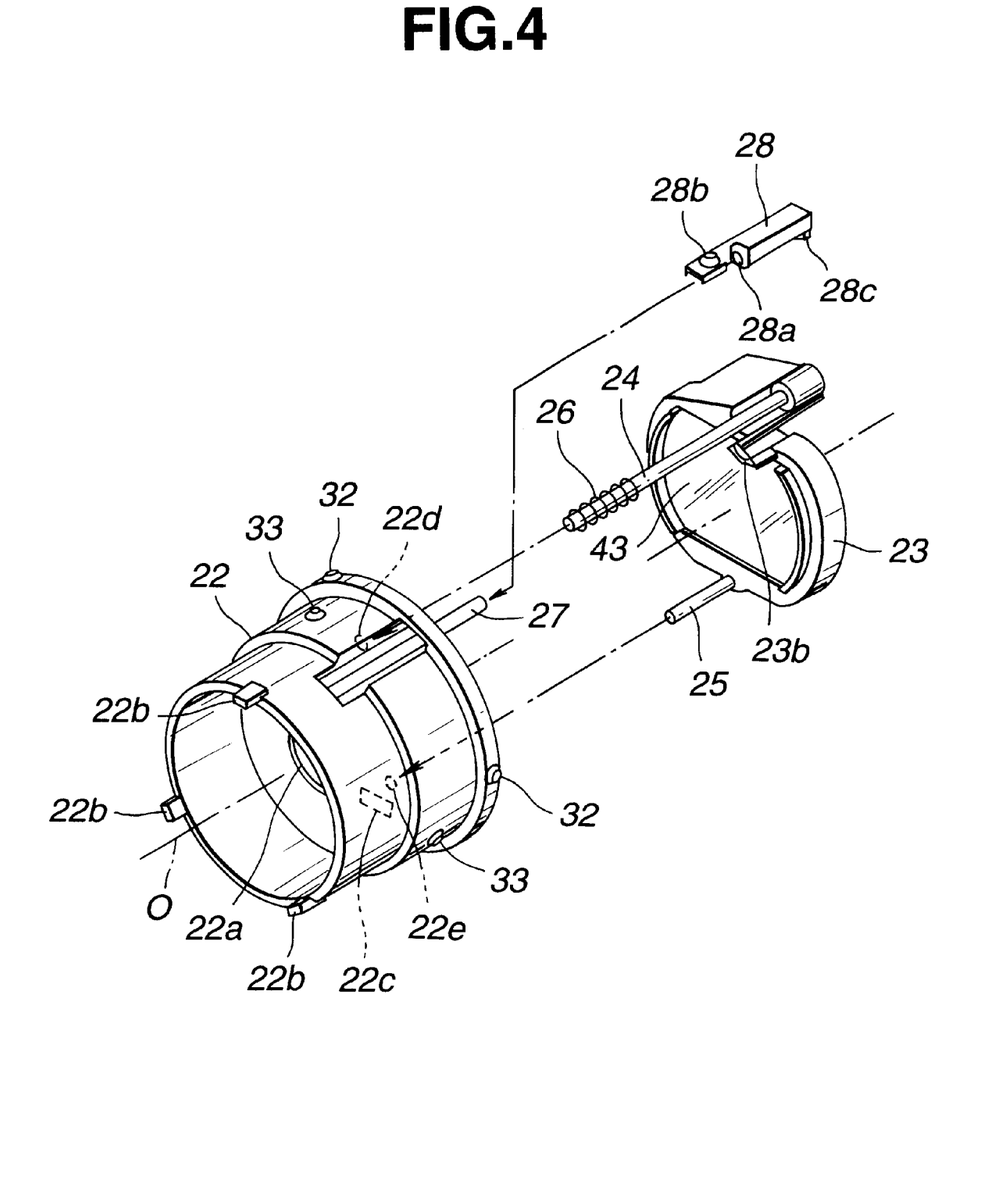
FIG. 4 is a partial exploded perspective view of group-2 frames and group-3 frames of the lens housing according to the embodiment of FIG. 1.
Figure 5:
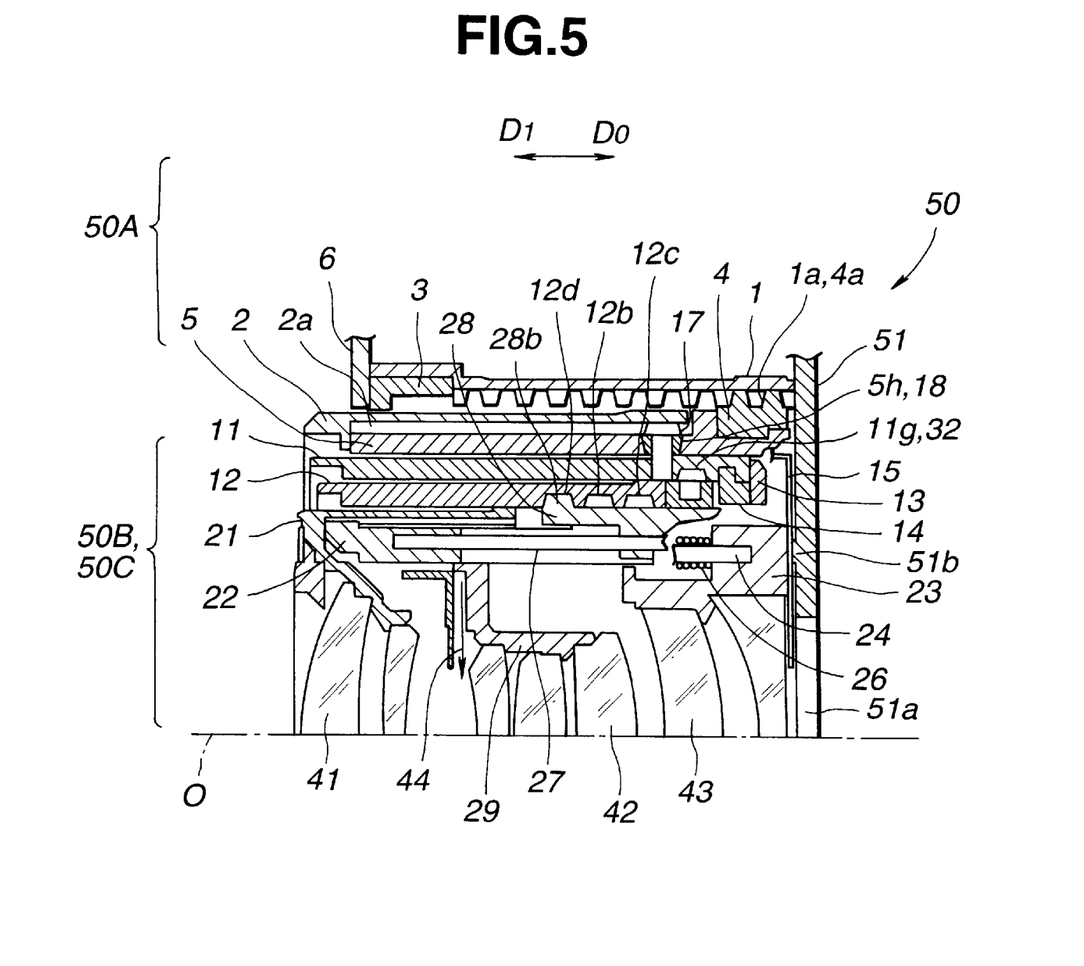
FIG. 5 is a vertical cross-sectional view showing a collapsed-barrel state of the lens housing according to the embodiments of FIG. 1.
Figure 6:
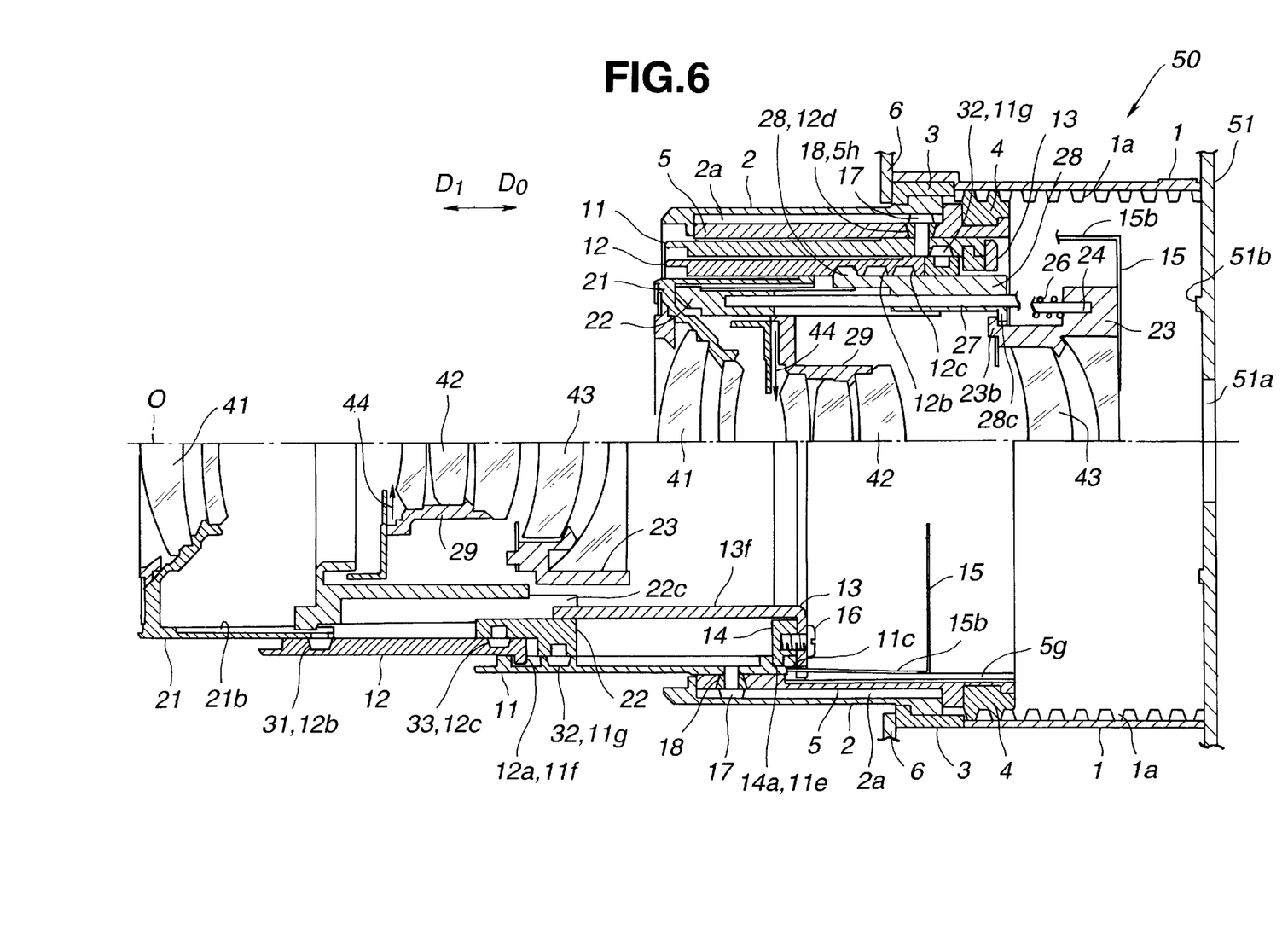
FIG. 6 is a vertical cross-sectional view of the lens housing of the embodiment of FIG. 1, the upper half showing an image-capturing preparation state and a wide-angle state and the lower half showing a telescopic state.
Figure 7:
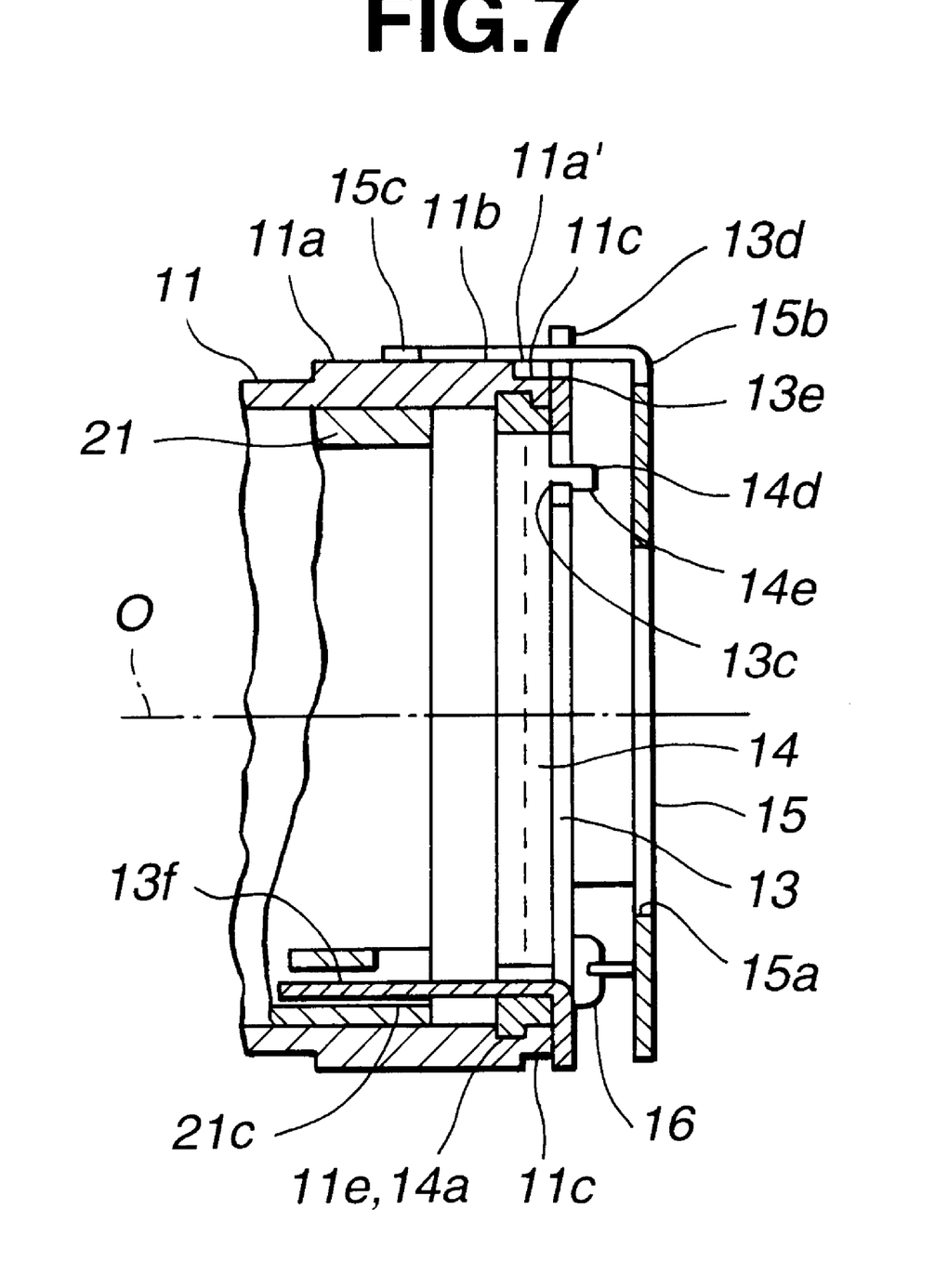
FIG. 7 is a partial vertical cross-sectional view of the movable flare aperture of the lens housing according to the embodiment of FIG. 1.

FIGS. 1 and 2 are exploded perspective views of an embodiment of a lens housing 50 according to the present invention. FIG. 3 is a partial perspective view of a movable flare aperture. FIG. 4 is an exploded perspective view of group-2 and group-3 frames and others. FIGS. 5 and 6 are vertical cross-sectional views of the lens housing 50 in different states; FIG. 5 is a view of a collapsed-barrel state; FIG. 6 shows an image-capturing preparation state or a wide-angle state in the upper half portion, and a telescopic state in the lower half. FIG. 7 is a partial vertical cross-sectional view of the movable flare aperture. Referring back to FIGS. 1 and 2, the individual components are not shown in assembly orientation for ready understanding.

The lens housing 50 has a collapsible-barrel drive system 50A, a lens-group drive system 50B, and a lens-group frame section 50C. The collapsible-barrel drive system 50A in FIG. 1 extends and retracts the lens housing between a collapsed-barrel position and an image-capturing preparation position, that is, a collapsible-barrel drive region. The lens-group drive system 50B extends the individual lens-group frames shown in FIG. 2.

As shown in FIG. 1, the collapsible-barrel drive system 50A has stationary frame 1, a rotating frame 2, a helicoid ring 4, and a moving frame 5. The stationary frame 1, is fixed to and supported mainly by a camera body (not shown) and has a helicoid-ring drive gear 7 and a drive ring 3, which is the drive member. The rotating frame 2 is a lens frame that extends and retracts between the collapsed-barrel position and the image-capturing preparation position, and rotationally moves between a wide-angle position and a telescopic position at the image-capturing preparation position. The helicoid ring 4 is rotatably and movably supported by the moving frame 5, described below. The moving frame 5, is a lens frame that moves linearly with the rotating frame 2 between the collapsed-barrel position and an image-capturable position.

The individual members of the collapsible-barrel drive system 50A are described below in more detail. The stationary frame is fixed to and supported by a camera body 51 (FIG. 5). It has a linearly-guiding groove 1d for receiving a tab of the moving frame which opens through an exterior peripheral section. It also has a female helicoid thread 1a and linearly-guiding grooves 1b in an interior peripheral section. The drive ring 3 is rotatably drivingly received in a drive-ring-supported section 1c. A thrust-direction position of the drive ring 3 is defined by a stopper plate 6. The helicoid-ring drive gear 7 extends axially and is rotatably supported by an exterior peripheral section. A toothed section of the helicoid-ring drive gear 7 is exposed to the interior peripheral section of the stationary frame 1.

The linearly-guiding grooves 1b and other linearly-guiding grooves described below are provided parallel to an optical axis 0 of an image-capturing optical system.

The aforementioned drive ring 3 has a zoom gear 3a and a viewfinder gear 3b in an exterior peripheral section, and has groove-like indented sections 3c in an interior peripheral section. The zoom gear 3a drivingly engages with a zoom drive system (not shown). The viewfinder 3b drivingly engages with a viewfinder drive system (not shown).

The aforementioned rotating frame 2 has a linearly-guiding groove 2a in an interior peripheral section, an interior peripheral grooved 2b in a front-end section of an interior peripheral section (on the side of a subject), and projections 2c on an exterior peripheral section. The aforementioned helicoid ring 4 has a male helicoid thread 4a and a drive gear 4b on an exterior peripheral section.

The aforementioned moving frame 5 has an electronic-flash drive projection 5a, linearly-guiding-groove projections 5b and 5c, projections 5d, and a peripheral guide 5e formed between the projections 5d and a ring-like rib connecting the projections 5c and the projection 5b, and the individual projections 5c on an exterior peripheral section. The moving frame 5 also has a projection 5f at the end, and three lines of linearly-guiding grooves 5g in an interior peripheral section. The moving frame 5 has cam grooves 5h, each oblique to the optical axis and opening through the interior and exterior peripheral sections.

In the collapsible-barrel drive system 50A constructs from the aforementioned members, the helicoid ring 4 is rotatably received in the moving frames 5 via the peripheral guide 5e and axially controlled. The lens-group drive system 50B and the lens-group frame section 50C, described below, are assembled so as be rotatable, extendable, and retractable. At this time, the moving frame 5 is received in the interior peripheral section of the rotating frame 2. In this state, since the projection 5f engages with the interior peripheral groove 2b, the moving frame 5 is rotatably supported and axially controlled in relation to the rotating frame 2.

The rotating frame 2 and the moving frame 5 are individually inserted into the stationary frame 1 so as to move linearly when the projections 2c, 5c, and 5b are individually received in the linearly-guiding grooves 1b and 1d. At this time, the male helicoid thread 4a of the helicoid ring 4 is engaged with the female helicoid thread 1a of the stationary frame 1; and the drive gear 4b is engaged with the helicoid-ring drive gear 7.

When the aforementioned rotating frame 2 and moving frame 5 are received in the stationary frame 1, and when the moving frame 5 and the rotating frame 2 are in the collapsible-barrel position on the film side (FIG. 5), when the helicoid-ring drive gear 7 is rotated clockwise (as viewed from the subject), in direction B1, the helicoid ring 4 rotates counterclockwise, in direction C1. This rotational movement causes the moving frame 5 and the rotating frame 2 to integrally extend in direction D1 (toward the subject) up to the image-capturing preparation position (upper half of FIG. 5).

When the moving frame 5 and the rotating frame 2 have reached the image-capturing preparation position, the rotating frame 2 disengages from the linearly-guiding grooves 1b of the stationary frame 1, and is received in the side of the indented sections 3c of the drive ring 3. At least proximate to the image-capturing preparation position, the drive ring 3 is driven to a rotationally-movable position so that the indented sections 3c can engage with the projections 2c.

When the drive ring 3 is assembled with the rotating frame 2, when the drive ring 3 is rotated in direction E0 by the zoom drive system, the rotating frame 2 rotates slightly in the same direction from the image-capturing preparation position and reaches the wide-angle position, which is an image-capturing position. When the rotating frame 2 rotates farther in the same direction described above, it is zoom-driven to the telescopic position. When the drive ring 3 is rotated in the reverse direction, that is, in direction E1, the rotating frame 2 rotates from the zoomed position to the image-capturing preparation position. When the helicoid-ring drive gear 7 is rotated farther in the reverse direction to the above, that is, in direction B0, the rotating frame 2 and the moving frame 5 can be retracted to the collapsed-barrel position.

Hereinbelow, a description will be given of the lens-group drive system 50B.

As shown in FIGS. 2, 3, 4 and 7, the lens-group drive system 50B has an M-cam frame 11, an F-cam frame 12, a key ring 13, and a movable flare aperture 15. The M-cam frame 11 is inserted into the moving frame 5 and is driven forwardly or backwardly. The F-cam frame 12 rotates with the M-cam frame 11, and extends and retracts via a group-2 frame 22. The key ring 13 is fitted with a key stopper 14 and guides lens-group frame linearly. The movable flare aperture 15 moves linearly and is supported by the M-cam frame 11.

Hereinbelow, the individual members of the lens-group drive system 50B are described in more detail.

The M-cam frame 11 is rotatably, extendably and retractably received in the interior peripheral section of the aforementioned moving frame 5. The M-cam frame 11 has an exterior peripheral surface 11a, three cam followers 17, three cam followers 18, a stepped side face 11b, a stepped peripheral face 11c, and end exterior peripheral surface 11a', and a peripherally sloped face 11d. The exterior peripheral surface 11a is s second slide face on which end protrusions 15c of the movable flare aperture slide. The cam followers 17 are press fit into the M-cam frame 11 along individual axes. The cam followers 18 rotatably receive the axes of the cam followers 17. The peripherally sloped face 11d is adjacent to the exterior peripheral surface 11a' in the peripheral direction. On an interior peripheral section, the M-cam frame 11 has an interior peripheral groove 11e in an end section on the film side, three straight-guiding grooves 11f, and three group-2 cam grooves 11g, which are oblique to the optical axis 0.

The stepped peripheral face 11c described above is formed in an end section on the film side with one step indented down from the exterior peripheral surface 11a. The stepped peripheral face 11c is a first slide face on which the end protrusion 15c of the arm section 15b of the movable flare aperture 15 slides. The width of the stepped peripheral face 11c in the axial direction is slightly larger than the width of the end protrusion 15c in the axial direction so that the end protrusion 15c can slide in the peripheral direction.

The exterior peripheral surface 11a' has the same diameter as that of the exterior peripheral surface 11a', which is the second slide face having the predetermined width on which the end protrusion 15c of the movable flare aperture 15 slides.

The peripherally sloped face 11d is sloped in the peripheral direction and continuously links the stepped peripheral face 11c and the exterior peripheral surface 11a' (FIG. 3).

The stepped side face 11b is perpendicular to the axis and formed between the exterior peripheral surface 11a and the stepped peripheral face 11c (FIG. 3).

The F-cam frame 12 is extendably and retractably received in an interior peripheral section thereof. The F-cam frame 12 has three protrusions 12a on an exterior peripheral section thereof. Also, on an interior peripheral section thereof, the F-cam frame 12 has three group-1 cam grooves 12b, three group-2 cam grooves 12c, and one group-3 cam groove 12d, which are oblique to the optical axis 0.

The movable flare aperture 15 is a very thin planer member. It has an opening 15a formed in a central portion and three arm sections 15b. Each of the three arm sections 15b is elastically deformable and protrudes and inclines slightly from a direction parallel to the optical axis 0 prior to assembly. The arm sections 15b have end protrusions 15c extending in the peripheral direction. In the assembled state, the end protrusions 15c elastically deform and are urged by a predetermined force to contact the exterior peripheral surface 11a or the stepped peripheral face 11c of the M-cam frame 11.

The aforementioned key ring 13 is a planar member for guiding the individual lens-group frames linearly. It has screw holes 13a, positioning holes 13b, three double-pronged protrusions 13d, grooves 13e between the individual double-pronged protrusions 13d, two cutouts 13c, and a linearly-guiding key 13f extending in the direction corresponding to the optical axis 0.

The width of the groove 13e allows the three arm sections 15b of the movable flare aperture to be inserted. The aforementioned width is smaller that the width of the end protrusion 15c in the peripheral direction. The diameter of the bottom face of the groove 13e is the same as or smaller than the diameter of the stepped peripheral face 11c of the M-cam frame 11 ( FIGS. 3 and 7).

The key stopper 14 is elastically deformable and has a circular cut out. The key stopper 14 has a ring 14a provided along the periphery, two screw holes 14b, positioning pins 14c at both sides of each of the screw holes 14b, and two stopper pins 14d. The positioning pins 14c can be received by the corresponding positioning holes 13b. Each of the stopper pins 14d has an engaging tab 14e (FIG. 7).

In the lens-group drive system 50B constructed from the above individual members, the F-cam frame 12 first is axially and slidably reconnected in the M-cam frame 11 when the protrusions 12a are engaged with the linearly-guiding grooves 11f in the interior peripheral section thereof. Then, the individual lens-group frames, described below, are assembled into interior peripheral sections of the M-cam frame 11 and the F-cam frame 12 so as to be expendable and retractable.

The M-cam frame 11, in which the lens-group frames and the like are installed, then is inserted into the interior peripheral section of the moving frame 5 of the collapsible-barrel drive system 50A so as to be rotatable and movable. Then, the cam followers 18 of the M-cam frame 11 are slidably engaged with cam grooves 5h. The cam followers 17, which define the axes of the cam followers 18, are inserted into the moving frame 5 and slidably engaged with the linearly-guiding grooves 2a of the rotating frame 2. The M-cam frame 11 is integrally rotated and moved by the rotating frame 2, then is driven forwardly and backwardly, that is, in a direction corresponding to the optical axis, by means of the cam grooves 5h of the moving frame 5.

When the key stopper 14 is expanded in the radial direction, the ring 14a is inserted into the interior peripheral groove 11e of the M-cam frame 11. The key stopper 14 is assembled with the key ring 13, the relative positioning of each being defined by the positioning pins 14c and the positioning holes 13b, then fixed by screws 16. Accordingly, the key ring 13 is rotatably supported and is axially controlled on the film side end in relation to the M-cam frame 11.

As shown in FIG. 7, the stopper pins 14d of the key stopper 14 are engaged with the cutouts 13c of the key ring 13. The engaging tab 14e of the stopper pins 14d also is engaged with the key ring 13 so as to eliminate a gap between the key stopper 14 and the key ring 13.

The double-pronged protrusions 13d are slidably engaged with the linearly-guiding grooves 5g. Therefore, the key ring 13 does not rotate and is driven linearly. In addition, since the linearly-guiding key 13f of the key ring 13 is slidably engaged with a linearly-guiding hole 22c of a group-2 lens frame 22, described below, the group-2 lens frame 22, a group-1 lens frame 21, supported by the group-2 lens frame 22, and a group-3 lens frame 23 are guided linearly.

The movable flare aperture 15 is installed such that the three arm sections 15b pass through the grooves 13e of the key ring 13 from the film side and the end protrusions 15c slide on the exterior peripheral surface 11a of the M-cam frame 11 or the stepped peripheral face 11c of the M-cam frame 11.

Hereinbelow, the aforementioned lens-group frame section 50C is described.

The lens-group frame section 50C has the group-1 lens frame 21, the group-2 lens frame 22, a movable follower 28, the group-3 lens frame 23, and a focusing frame 29. The group-1 lens frame 21 is installed in the M-cam frame 11 and the F-cam frame 12 and has lens-group-supporting frames that move linearly forwardly and backwardly, and has a group-1 lens 41. The group-2 lens frame 22 is guided linearly via the key ring 13 and is driven forwardly and backwardly by the M-cam frame 11. The movable follower 28 is driven forwardly and backwardly via the F-cam frame 12. The group-3 lens frame 23 is driven forwardly and backwardly via the movable follower 28 and supports a group-3 lens 43. The focusing frame 29 is supported by the group-2 lens frame 22, is driven linearly by a focusing-drive system (not shown), and supports a group-2 lens 42 (FIGS. 5 and 6).

The group-2 lens frame 22 has three cam followers 32, three cam followers 33 in an exterior peripheral section, and three protrusions 22b in an end section. In an exterior peripheral section, the group-2 lens frame 22 has the linearly-guiding hole 22c, an axis hole 22d, a cutout 22e, a guiding axis 27, and an opening 22a (FIG. 4). The linearly-guiding hole 22c receives the linearly-guiding key 13f. The axis hole 22d is provided in the direction of the optical axis 0. The guiding axis 27 is stationary and supported in the direction of the optical axis 0. The opening 22a is used for installation of a shutter 44.

The group-1 lens frame 21 has an opening 21a supporting the group-1 lens 41, three cam followers 31 in an exterior peripheral section, and linearly-guiding grooves 21b in an interior peripheral section.

The movable follower 28 is an elongated member for regulating the extending/retracting position of the group-3 lens frame 23. It has an axis hole 28a, a cam follower 28b, and an engaging tab 28c. The axis hole 28a slidably receives the guiding axis 27 of the group-2 lens frame 22. The engaging tab 28c engagingly stops the group-3 lens frame 23.

The group-3 lens frame 23 is slidably supported by the group-2 lens frame 22 in the linear direction. It has fixed guiding axes 24 and 25, an engaging section 23b corresponding to the engaging tab 28c, and an opening that supports the group-3 lens 43.

The focusing frame 29 supports the group-2 lens 42 and is supported by the group-2 lens frame 22 so that it can move forwardly and backwardly. The focusing frame 29 is driven forwardly and backwardly by means of a focusing-drive system (not shown) (FIGS. 5 and 6).

In the lens-group frame section 50C described above, the protrusions 22b on the exterior peripheral section on the subject side are slidable engaged with the linearly-guiding grooves 21b of the group-1 lens frame 21, then the group-1 lens frame 21 is assembled with the group-2 lens frame 22. The group-3 lens frame 23 is assembled therewith such that the guiding axes 24 and 25 are slidably received into the axis hole 22d and the cutout 22e, respectively. A pushing spring 26 is received by the guide axis 24, urging, in the direction of the film, the group-3 lens frame 23.

The guiding axis 27 is slidably inserted into the axis hole 28a, then the movable follower 28 is assembled with the group-2 lens frame 22. While the camera body 51 is not exerting force on the group-3 lens frame 23, the engaging tab 28c of the movable follower 28 engages with the engaging section 23b of the group-3 lens frame 23, thereby defining the position of the group-3 lens frame 23.

The lens-group frame section 50C is installed in the M-cam frame 11 and the F-cam frame 12 of the lens-group drive system 50B so that it can move linearly forwardly and backwardly. The linearly-guiding key 13f of the key ring 13 is slidably guided linearly through the linearly-guiding hole 22c of the group-2 lens frame 22, thereby supporting the group-1 and group-3 lens frames 21 and 23, respectively, and the movable follower 28 integrally with the group-2 lens frame 22 so that they can move linearly forwardly and backwardly.

The cam followers 31 of the group-1 lens frame 21 are engaged with the corresponding group-1 cam grooves 12b of the F-cam frame. The cam followers 32 and 33 of the group-2 lens frame 22 are engaged with the corresponding group-2 cam grooves 11g of the M-cam frame. The movable cam follower 28b is engaged with the group-3 cam groove 12d of the F-cam frame.

Having been configured as provided above, extending/retracting positions of members such as the individual frames are defined as described below with respect to the M-cam frame 11. The position of the F-cam frame 12 is defined by the group-2 lens frame 22 and the group-2 cam group-2 cam grooves of the F-cam frame 12. The position of the group-3 lens frame 23 is defined via the engaging tab 28c of the movable follower 28.

Hereinbelow, a description will be given of retraction and extension operations of the lens housing 50 configured as above.

When the lens housing 50 is in the collapsed-barrel state, as shown in FIG. 5, all the members such as the rotating frame 2 are maintained inside the immobilized frame 1. The group-3 lens frame 23 and the movable flare aperture 15 are urged by a protrusion 51b provided near an aperture 51a of the camera body 51 and placed in a stowed position. In this state, as shown in FIG. 7, the end protrusion 15c of the movable flare aperture 15 has slid forwardly on the exterior peripheral surface 11a of the M-cam frame 11.

To drive the lens housing 50 from the collapsed-barrel state to the image-capturing preparation state, the helicoid-ring drive gear 7 is rotated in the direction B1, and the helicoid ring 4 is rotated in the direction C1. According to the rotation, the rotating frame 2 and the moving frame 5 are guided by the linearly-guiding grooves 1b and are integrally moved in direction D1, thereby extending the lens housing 50 from the collapsed-barrel position to the image-capturing preparation position upper half of FIG. 6). The moving frame 5 remains engaged with the linearly-guiding grooves 1d and 1b. However, the projections 2c disengage from the linearly-guiding grooves 1b and engage with the indented sections 3c, and according to the drive ring 3, the rotating frame 2 becomes rotatable.

When the drive ring 3 is further rotated by the zoom drive system by a slight angle from the aforementioned image-capturing preparation state, the lens housing 50 assumes the wide-angle state as shown in the upper half of FIG. 6.

During the shift from the collapsed-barrel state to the image-capturing preparation state and the wide-angle state, the group-2 lens frame 22, the rotating frame 2, and the moving frame 5 integrally extend. The group-3 lens frame 23 are urged by the pushing spring 26 and thereby moves backwardly from the M-cam frame 11 and the group-2 lens frame 22. Then, the group-3 lens frame 23 moves backwardly from a wide-angle-ready position where the engaging tab 28c of the movable follower 28 engages with the engaging section 23b.

Also, during the aforementioned driving, the movable flare aperture 15 is pushed backwardly by the group-3 lens frame 23 with respect to the M-cam frame 11. The end protrusions 15c of the three arm sections 15b arrive over the exterior peripheral surface 11a' of the M-cam frame 11, as shown in FIG. 3. When the M-cam frame 11 rotates slightly in the direction E0 up to the wide-angle position, the end protrusions 15c slide down the peripherally sloped face 11d and arrive over the stepped peripheral face 11c. Thus, the movable flare aperture 15 is located relative to the M-cam frame 11 to provide an intended normal function.

To drive the lens housing 50 from the wide-angle state to a telescopic state, the drive ring 3 is rotated in the direction E0, and the rotating frame 2 is rotated in the same direction (lower half of FIG. 6). That is, the M-cam frame 11 rotates in direction E0 and extends along the cam grooves 5h of the moving frame 5. The F-cam frame 12 is rotated by the linearly-guiding grooves 11f integrally with the M-cam frame 11. The extending position is defined by the cam followers 33 of the group-2 lens frame 22, which engage with the group-2 cam grooves 12c.

Guided linearly by the key ring 13, the group-2 lens frame 22 is extended by the group-2 cam grooves 11g of the M-cam frame 11 to a telescopic-ready position. The group-1 lens frame 21 is extended to the telescopic-ready position by the group-1 cam grooves 12b of the F-cam frame 12 which engage with the cam followers 31. The position of the movable follower 28 is defined by the group-3 cam groove 12d, and the position of the group-3 lens frame 23 is determined by the cam follower 28b of the aforementioned movable follower 28.

While the M-cam frame 11 rotates to extend and retract between the wide-angle state and the telescopic state, the movable flare aperture 15 is supported without being rotated by the grooves 13e of the key ring 13. Thus, the movable flare aperture 15 is supported in a predetermined position spaced with respect to the M-cam frame 11 and provides an intended normal function.

To drive the lens housing 50 from the wide-angle state to the image-capturing preparation state and further to the collapsed-barrel position, first, the drive ring 3 is rotated in the direction E1, thereby driving the lens housing 50 to the image-capturing preparation state. In this state, the group-1 lens frame 21 and the group-2 lens frame 22 are extended within the moving frame 5. The group-3 lens frame 23 remains in a position where it is relatively moved backwardly with respect to the M-cam frame 11 (upper half of FIG. 6). The end protrusions 15c rotate in the direction E1 and slide on the continuously sloped face 1d over the exterior peripheral surface 11a' (FIG. 3).

Subsequently, the helicoid-ring drive gear 7 is rotationally driven in the direction B0 so as to rotate the helicoid ring 4 in the direction C0. The moving frame 5 and the rotating frame 2 integrally move backwardly in a direction D0, and the projections 2c of the rotating frame 2 disengage from the drive ring 3. When the helicoid ring 4 is further rotated, the rotating frame 2 moves integrally with the moving frame 5 in the direction D0 and is retracted to the collapsed-barrel position so as to be housed within the immobilized frame 1 (FIG. 5).

According to the above collapsed-barrel operation, the group-3 lens frame 23 and the movable flare aperture 15 are pushed by the protrusion 51b of the camera body 51, overcome the urging force of the pushing spring 26, and move forwardly. As a result, the group-3 lens frame 23 is housed in the group-2 lens frame 22 (FIG. 5). The movable flare aperture 15 also moves forwardly relative to the M-cam frame 11 in the optical-axis direction, and the end protrusions 15c slide forward on the exterior peripheral surface 11a from the exterior peripheral surface 11a' of the M-cam frame 11 so as to be in a stowed state (FIG. 5).

As described above, according to the lens housing 50, the rotating frame 2, the moving frame 5, lens frames, and the like supported by the rotating frame 2 and the moving frame 5 are extended to the image-capturing position from the collapsed-barrel position according to the rotational movement of the rotating frame 2 supported by the moving frame 5. Upon assuming the image-capturing position, first, the drive ring 3 is coupled with the rotating frame 2 which rotates the rotating frame 2 so that the lens frames are zoom-driven. This configuration reduces the number of components and the space occupied, thereby allowing miniaturization and cost-reduction of the lens housing to be implemented.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lens housing for positioning lens frames in a stowed position and an image-capturing position and allowing variation of a focal length comprising:
   image-capturing lenses supported by the lens frames and allowing variation in the focal length thereof,
   an immobilized frame having a female helicoid thread for moving all of the lens frames and a rotatable drive gear provided parallel to an optical axis of the image-capturing lenses;
   a helicoid member, having a gear section engaged with the drive gear and a male helicoid thread engageable with the female helicoid thread and rotatably drivable by rotation of the drive gear for moving all of the lens frames to the stowed position and the image-capturing position; and
   a drive member supported by the immobilized frame so as to be rotatable around the optical axis, wherein, upon completion of forward movement of all of the lens frames, the drive member engages with the lens frames so as to be rotatably driven, whereby the image-capturing lenses are moved in a direction corresponding to the optical axis and the focal length of the image-capturing lenses is varied.

2. A lens housing for positioning lens frames in a stowed position and an image-capturing position comprising:
   image-capturing lenses supported by the lens frames and allowing variation in the focal length thereof;
   an immobilized frame having a female helicoid thread for moving all of the lens frames and a rotatable drive gear having an axis provided parallel to an optical axis of the image-capturing lenses;
   a helicoid member having a gear section engaged with the drive gear and a male helicoid thread engageable with the female helicoid thread and rotatably driveable by rotation of the drive gear for moving all of the lens frames; and
   a drive member supported by the immobilized frame so as to be rotatable around the optical axis, wherein, upon completion of forward movement of all the lens frames, the lens frames engage with the drive member and the driving member is then rotationally driven, whereby the image-capturing lenses are moved in a direction corresponding to the optical axis.

3. A lens housing for positioning lens frames in a stowed position and an image-capturing position comprising:
   image-capturing lenses supported by the lens frames;
   a first drive mechanism that moves the lens frames linearly in a direction corresponding to an optical axis of the image-capturing lenses to the stowed position and an image-capturing preparation position; and
   a second drive mechanism coaxially engaging with exterior peripheral sections of the lens frames to rotationally drive the lens frames thereby extending the lens frames or the lenses to the image-capturing position in the direction when the first drive mechanism has extended the lens frames to the image-capturing preparation position.

4. A lens housing as claimed in claim 3, wherein the first drive mechanism comprises:
   an immobilized frame having a female helicoid thread and a rotatable drive gear having an axis parallel to the optical axis of the image-capturing lenses, and
   a helicoid member, supporting the lens frames, having a gear section engaged with the drive gear and a male helicoid thread engageable with the female helicoid thread, wherein the helicoid member is driven by rotation of the drive gear, and engagement of the female helicoid thread and the male helicoid thread is used to move the lens frames in the direction.

5. A lens housing as claimed in claim 3, wherein the second drive mechanism comprises a drive member supported so as to be rotatable around the optical axis with respect to the immobilized frame, in which, when the lens frames are moved forwardly by the first drive mechanism in the direction, the second drive mechanism engages with the lens frames, and the drive member is rotationally driven, whereby the lenses are moved in the direction.

6. A lens housing as claimed in claim 3, wherein the first drive mechanism comprises:
   an immobilized frame having a female helicoid thread and an axis parallel to the optical axis, a gear section engaged with the drive gear, and a helicoid member having a male helicoid thread engageable with the female helicoid thread, in which the helicoid member is rotationally driven by rotation of the drive gear, and engagement of the female helicoid thread and the male helicoid thread is used to move the lens frames in the direction; and the second drive mechanism comprises a drive member supported so as to be rotatable around the optical axis with respect to the immobilized frame, in which, when the lens frames are moved forwardly by the first drive mechanism in the direction, the second drive mechanism engages with the lens frames, and the drive member is rotationally driven, whereby the lenses are moved in the direction.

7. A lens housing as claimed in claim 3, wherein the lens frames comprise engagements for stopping movement when the lens frames are moved by the first drive mechanism to the image-capturing preparation position and are rotated by the second drive mechanism by a predetermined angle.

8. A lens housing as claimed in claim 7, wherein the engagements are protrusions provided in end sections of the lens frames.

9. A lens housing as claimed in claim 3, wherein the image-capturing lenses are variable-focal-length lenses, and the second drive mechanism moves the lens frames in the direction to vary focal lengths of the image-capturing lenses.

10. A lens housing for moving lens frames in a direction corresponding to an optical axis of image-capturing lenses comprising:

a first drive mechanism for moving the lens frames linearly in the direction to a first position and a second position; and a second drive mechanism for coaxially engaging with exterior peripheral sections of the lens frames and moving the lens frames or the lenses from the second position to a third position when the first drive mechanism moves the lens frames to the second position.

11. A lens housing as claimed in claim 10, wherein the first drive mechanism uses helicoid mechanisms provided in a ring member and an immobilized frame to move the lens frames linearly in the direction.

12. A lens housing as claimed in claim 10, wherein the second drive mechanism uses cam mechanisms provided in a ring member and an immobilized frame to move the lens frames or the lenses in the direction when the ring member rotates relative to the immobilized frame.

13. A lens housing as claimed in claim 10, wherein the first position is a stowed position where the lens frames have been stowed in an apparatus body, the second position is a projecting position where the lens frames are projected from the apparatus body, and the third position is a maximum-projecting position where the lens frames are further projected from the apparatus body.

14. A lens housing as claimed in claim 10, wherein the image-capturing lenses are variable-focal-length lenses, and the second drive mechanism moves the lens frames or the lenses in the direction to vary focal lengths of the image-capturing lenses.

* * * * *